United States Patent [19]

Hui

[11] Patent Number: 5,669,103

[45] Date of Patent: Sep. 23, 1997

[54] INTEGRATED HANDLE FOR TELESCOPING TUBES

[75] Inventor: Jiang Hen Hui, Shenzhen, China

[73] Assignee: Clipper Products, Cincinnati, Ohio

[21] Appl. No.: 670,292

[22] Filed: Jun. 26, 1996

[51] Int. Cl.⁶ ................................................ B25G 1/04
[52] U.S. Cl. ................................... 16/115; 280/655
[58] Field of Search ................................. 16/115; 190/39,
190/115, 117; 280/655, 655.1, 47.315

[56] References Cited

U.S. PATENT DOCUMENTS

| | | | |
|---|---|---|---|
| 3,998,476 | 12/1976 | Kazmark | 280/655 |
| 5,367,743 | 11/1994 | Chang | 16/115 |
| 5,371,923 | 12/1994 | Chang | 16/115 |
| 5,400,472 | 3/1995 | Chang | 16/115 |
| 5,502,876 | 4/1996 | Wang | 280/655 |
| 5,515,576 | 5/1996 | Tsai | 280/655 |
| 5,522,615 | 6/1996 | Kazmark | 280/655 |
| 5,542,150 | 8/1996 | Tu | 280/655.1 |

Primary Examiner—Chuck Y. Mah
Assistant Examiner—Mark Williams
Attorney, Agent, or Firm—Donald J. Ersler

[57] ABSTRACT

An integrated handle for telescoping tubes includes a handle assembly, at least one ball housing assembly, at least one connecting rod, and at least one set of telescoping tubes. The handle assembly comprises a handle, a cover, a button, and at least one lever. The ball housing assembly comprises a ball housing, a cam rod, a spring, and at least one ball. The cam rod slidably fits inside the ball housing. An upward movement of the cam rod forces at least one ball out, a downward motion allows retraction of at least one ball. The set of telescoping tubes comprises an upper and lower telescoping tube. The lower telescoping tube has a plurality of locking holes disposed at different heights. At least one upper telescoping tube is fastened to the bottom of the handle. When it is desired to extend or retract the integrated handle for telescoping tubes, the button is depressed which pushes the cam rod in a downward movement through the connecting rod and releases force on at least one ball contained in the ball housing. When the button is released, at least one ball is forced outward by the cam rod and locks into at least one locking hole disposed in the lower telescoping tube.

5 Claims, 2 Drawing Sheets

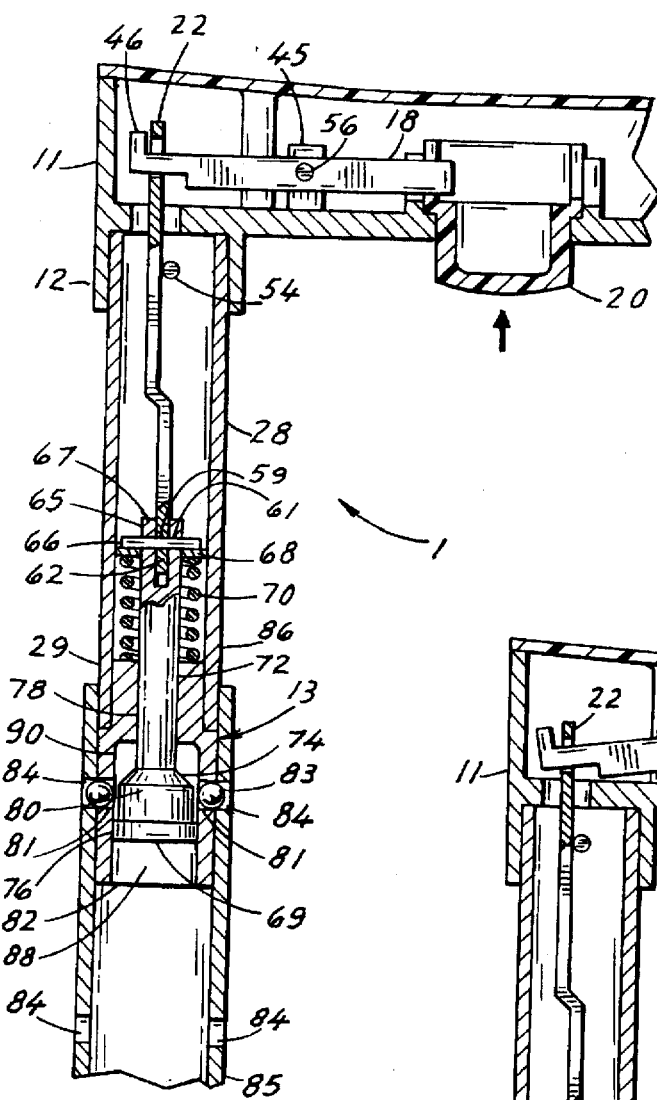
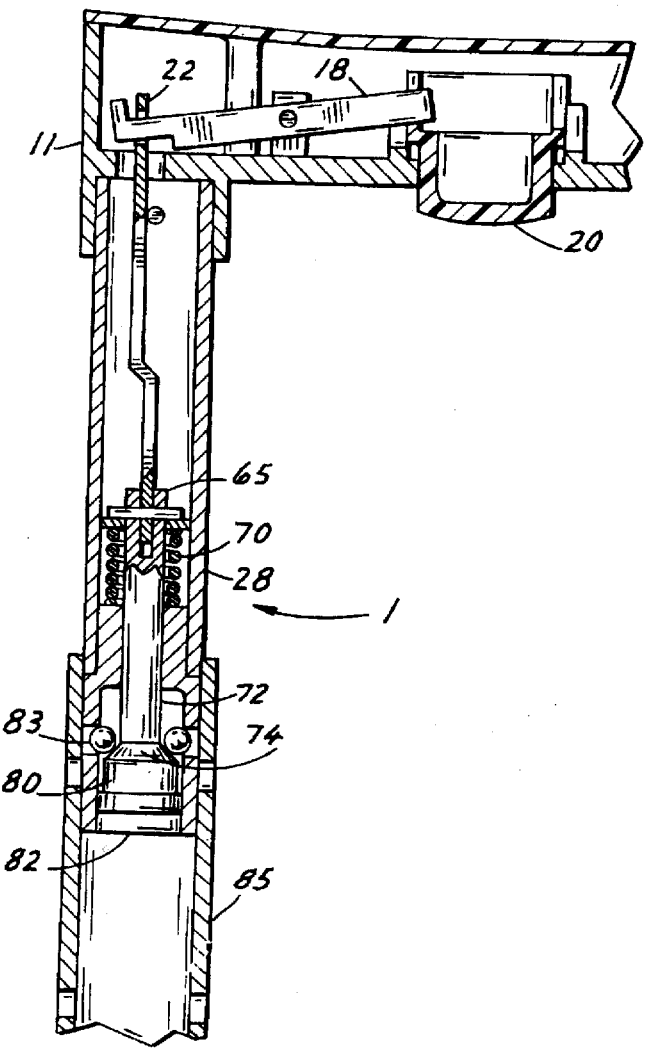
FIG. 2
FIG. 3

1

INTEGRATED HANDLE FOR TELESCOPING TUBES

BACKGROUND OF THE INVENTION

1. Field of the Invention

The present invention relates generally to telescoping handles for luggage carts and more specifically to an integrated handle for telescoping tubes which is more convenient and is easier to operate than that of the prior art.

2. Discussion of the Prior Art

The telescoping handle is used in conjunction with a luggage cart. The telescoping handle is adjustable to different extended positions for pulling a luggage cart. The telescoping handle is pushed all the way down when the cart is not in use or being stored. There are several styles of telescoping handles used with luggage carts. Unfortunately, each style of telescoping handle has a drawback which makes it difficult to use.

Two recent examples of telescoping handles for luggage carts are U.S. Pat. Nos. 5,371,923, and 5,400,472 both by Chang. The Chang '923 patent discloses a rotary handle which engages and disengages a set of cam operated balls which lock into holes in a set of telescoping tubes. The disadvantage to this design is a user may accidently disengage the locking mechanism by running over a bump, or suddenly shifting their hand. The handle combines the holding and locking function. The Chang '472 patent is a better design since it separates the holding and release functions. The drawback is that if a user is wearing gloves, they will have difficulty fitting the gloves between the operating bar and handle. Further, the user must take their fingers off the handle to lock or unlock the extended position of the telescoping handle.

Accordingly, there is a clearly felt need in the art for an integrated handle for telescoping tubes which allows the user to keep their hand around the handle without the risk of unlocking the extended telescoping tubes.

SUMMARY OF THE INVENTION

The primary objective of the present invention is to provide an integrated handle for telescoping tubes which allows the user to keep their hand around the handle without the risk of unlocking the extended telescoping tubes.

According to the present invention, an integrated handle for telescoping tubes includes a handle assembly, a ball actuating housing, a connecting rod, and at least one set of telescoping tubes. The handle assembly comprises a handle, a cover, a button, and at least one lever. The ball housing assembly comprises a ball housing, a cam rod, a spring, and at least one ball.

The handle has a length, a top surface, a bottom surface, a first end and second end. An opening disposed in the center of the length of the handle sized to receive the outside perimeter of the button. The button has a perimeter, a first end, and a second end. The second end of the button has at least one slot which is sized to receive a first end of the lever. At least one lever is pivotally connected to the top surface of the handle such that when the button is depressed, a second end of the lever swings toward the bottom surface of the handle. A cover is sized to be received by the top surface of the handle. A first boss and a second boss are disposed on the bottom surface of the handle at the first and second ends, respectively. The first and second bosses are sized to receive a first end of an upper telescoping tube.

A first end of the connecting rod is pivotally connected to the second end of the lever. A second end of the connecting rod is pivotally connected to the cam rod. The ball housing has an outer diameter, an inner diameter, a first end, and a second end. The inner diameter of the ball housing is sized to receive the cam rod. The ball housing has at least one radial hole which originates at the outer diameter and is terminated by the inner diameter, each radial hole is sized to slidably receive a ball. Each radial hole of the ball housing is swaged on the outside diameter to prevent the ball from falling out of the ball housing.

A lower telescoping tube has a plurality of holes which are disposed at different heights along the length of the lower telescoping tube. When it is desired to extend or retract the integrated handle for telescoping tubes, the button is depressed which pushes the cam rod through the connecting rod and releases force on at least one ball contained in the ball housing. The upper telescoping tube may be locked at any extended position as dictated by the plurality of holes in the lower telescoping tube.

Accordingly, it is an object of the present invention to provide an integrated handle for telescoping tubes which can be adjusted without the user releasing their fingers from the handle.

It is a further object of the present invention to provide an integrated handle for telescoping tubes which allows a user to grasp the handle while wearing gloves.

Finally, it is another object of the present invention to provide an integrated handle for telescoping tubes which allows the user to grasp the handle without risk of the telescoping tubes becoming unlocked while pulling the luggage cart.

These and additional objects, advantages, features and benefits of the present invention will become apparent from the following specification.

BRIEF DESCRIPTION OF THE DRAWINGS

FIG. 2 is a cross sectional detail view of the integrated handle for telescoping tubes when in a locked position in accordance with the present invention; and FIG. 3 is a cross sectional detail view of the integrated handle for telescoping tubes when in an unlocked position in accordance with the present invention.

DETAILED DESCRIPTION OF THE PREFERRED EMBODIMENTS

Figure 1:
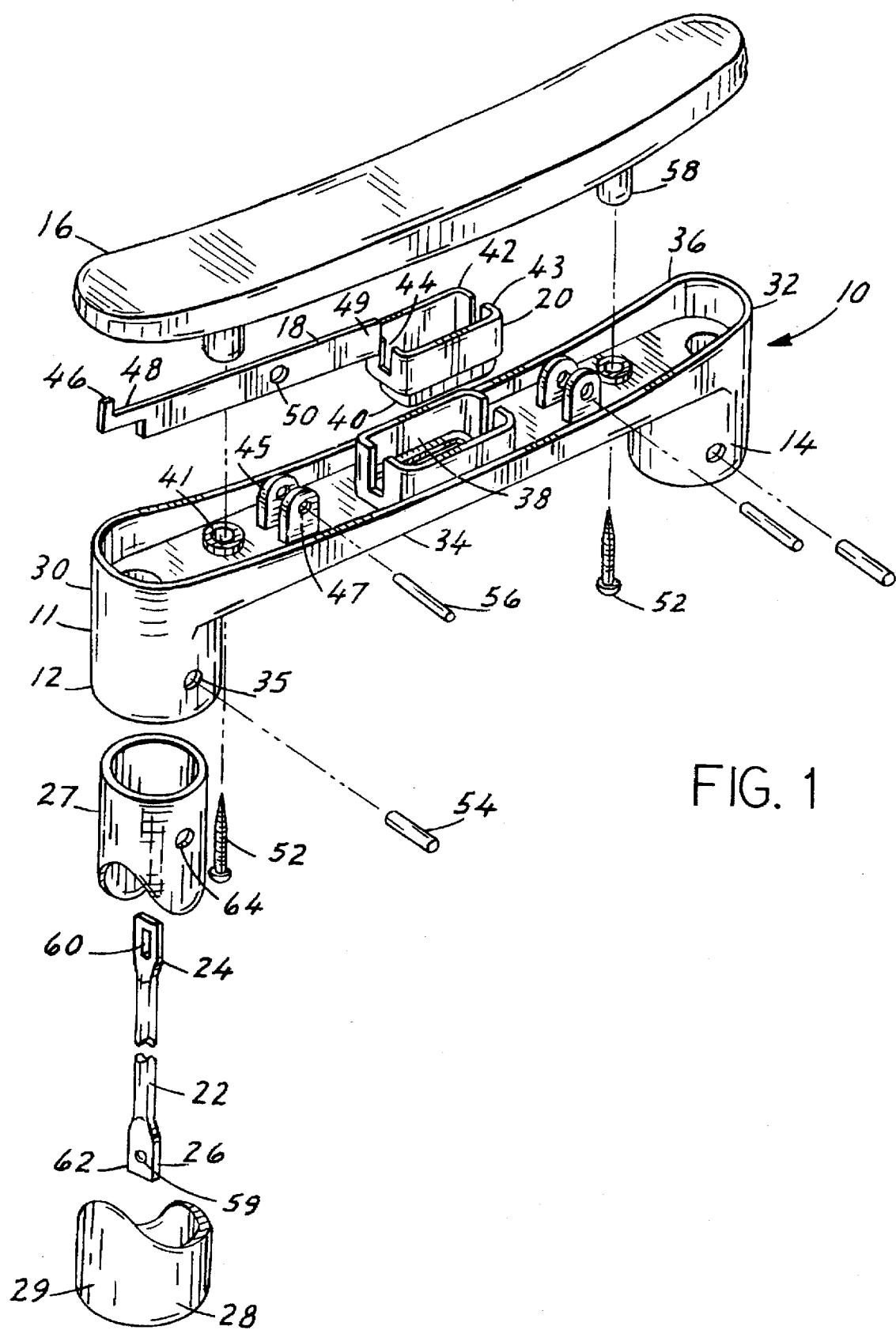
FIG. 1 is an exploded perspective detail view of a handle assembly in accordance with the present invention.

With reference now to the drawings, and particularly to FIG. 1, there is shown an exploded perspective detail view of a handle assembly 10 with an upper telescoping tube 28 and a connecting rod 22. The handle assembly 10 comprises a handle 11, a cover 16, at least one lever 18, and a button 20. The handle has a length, a top surface 36, a bottom surface 34, a first end 30 and a second end 32. An opening 38 disposed in the center of the length of the handle 11 is sized to receive the button 20. The button has a perimeter 43, a first end 40, and a second end 42. The lever 18 has a length, a first end 48, and a second end 49. The second end 42 of the button 20 has at least one slot 44 which is sized to receive a first end 49 of the lever 18. A hole 50 is disposed in substantially the center of the lever 20. The hole 50 is sized to slidably receive a dowel 56. At least one pair of protrusions 45 extend upward from the top surface 36 of the handle 11. A pair of concentric holes 47 are formed in the pair of protrusions 45, the pair of concentric holes 47 are sized to firmly receive the dowel 56. When the dowel 56 is inserted through the pair of protrusions 45 and the lever 18, the lever 18 pivots with respect to the handle 11.

The connecting rod 22 has a length, a first end 24, and a second end 26. A slot 60 is disposed at the first end 24 of the connecting rod 22. The slot 60 is sized to fit over a tab 46 at the first end 48 of the lever 18. The tab 46 retains the connecting rod 22 from sliding off the lever 18 when thereof is in motion.

A first boss 12 is disposed on the bottom surface 34 at the first end 30 of the handle 11. The first boss 12 is sized to slidably receive the first end 27 of the upper telescoping tube 28. A pair of concentric holes 35 are formed in the first boss 12 and a pair of concentric holes 64 are formed in the first end 27 of the upper telescoping tube 28. The concentric holes 35 & 64 are sized to firmly receive a dowel 54. The upper telescoping tube 28 is retained in the first boss 12 by means of the dowel 54. A second boss 14 is disposed on the bottom surface 34 at the second end 32 of the handle 11. The second boss 14 is sized to slidably receive a second upper telescoping tube.

The cover 16 is attached to the top surface 36 of the handle 11 to cover the button 20 and at least one lever 18. The cover 16 is attached to the handle 11 by a plurality of screws 52 which pass through a plurality of clearance holes 41 in handle 11. The plurality of screws 52 are screwed into a plurality of posts 58 and retain the cover 16 against the handle 11.

FIG. 2 shows a cross sectional detail view of the integrated handle for telescoping tubes 1 when in a locked position. A ball housing assembly 13 comprises a ball housing 82, a cam rod 65, a spring 70, and at least one ball 83. The cam rod 65 has a length, a first end 67, a second end 69, a low cam surface 72, a high cam surface 80, and a transitional surface 74. A slot 60 is cut into the cam rod 65 at the first end 67. The second end 62 of the connecting rod 22 is inserted into the slot 60 of the cam rod 65. A pair of concentric holes 61 are formed in the cam rod 65. The pair of concentric holes 61 are sized to firmly receive a dowel 66 which is inserted through a hole 59 in the connecting rod 22 and the pair of concentric holes 61 in cam rod 65 to hold thereof together.

The spring 70 forces the cam rod 65 to maintain the high cam surface 80 against at least one ball 83. The spring is retained by a washer 68 and a dowel 66. The other end of the spring 70 is retained by a first end 86 of the ball housing 82. The ball housing 82 has a length, a first end 86, and a second end 88. The second end 29 of the upper telescoping tube 28 is pressed onto the first end 86 of the ball housing 82. A first bore 90 originates at the second end 88 of the ball housing 82 and continues to substantially the first end 86. A lip 76 is disposed at the second end 69 of the cam rod 65. The first bore 90 is sized to slidably receive the lip 76 of the cam rod 65. The lip 76 of the cam rod 65 provides minimum frictional contact between the ball housing 82 and the cam rod 65. A second bore 78 originates at the first end 86 of the ball housing 82 and communicates with the first bore 90. The second bore 78 provides clearance for the first end 67 of the cam rod 65.

The inner diameter of the lower telescoping tube 85 slidably fits over the outer diameter of the upper telescoping tube 28 and the outside diameter of the ball housing 82. A plurality of locking holes 84 are formed in the lower telescoping tube 85 at different heights. At least one radial hole 81 originates at the outside diameter of the ball housing 82 and communicates with the second bore 90. A ball 83 is placed in each radial hole 81 of the ball housing 82. The radial hole 81 of the ball housing 82 is swaged on the outside diameter to prevent the ball 83 from falling out of the ball housing 82. Each ball 83 is forced into each locking hole 84 in the lower telescoping tube 85. The ball 83 is supported by the high cam surface 80 of the cam rod 65. At least one lower telescoping tube 85 is fastened to the frame of the luggage cart.

The integrated handle for telescoping tubes 1 is in a locked position when each ball 83 is forced outward by the high cam surface 80 of the cam rod 65 into the locking hole 84. The cam rod 65 is maintained in position by the spring force of the spring 70. The plurality of locking holes 84 provide the user with a choice of different heights.

FIG. 3 shows a cross sectional detail view of the integrated handle for telescoping tubes 1 when in an unlocked position. To unlock the lower and upper telescoping tubes 28 & 85, the spring 70 must be compressed to allow at least one ball 83 to escape into the recess created by the lower cam surface 72 of the cam rod 65.

The spring 70 is compressed when the button 20 is depressed into the handle 11. The depression of the button 20 causes the lever 18 to push the cam rod 65 downward through the connecting rod 22 and release force on at least one ball 83 contained in the ball housing 82. At least one ball 83 is allowed to escape into the recess created by the lower cam surface 72 of the cam rod 65. The transitional surface 74 provides a smooth transition from the high cam surface 80 to the lower cam surface 72. When at least one ball 83 escapes into the recess created by the lower cam surface 72, the lower and upper telescoping tubes 28 & 85 become unlocked.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An integrated handle for telescoping tubes which facilitates easy height adjustment of a luggage carrier comprising:

a handle having a length, a bottom surface, a top surface, a first end, and a second end, said bottom surface having an opening disposed substantially in the center thereof, said bottom surface having a first bore disposed at one end, said bottom surface having a second bore disposed at the end opposite said first bore, a first concentric hole being formed in said first bore, a second concentric hole being formed in said second bore;

a button which slidably fits inside said opening of said handle;

at least one lever having a tab at a first end, said lever being pivotally connected to said top surface of said handle, said lever being in contact with said button, wherein when said button is depressed, said lever swings toward said top surface;

at least one ball;

at least one lower telescoping tube, having a plurality of locking holes formed at different heights;

at least one upper telescoping tube, having a concentric hole formed in one end thereof;

a connecting rod having a first end and a second end;

a cam rod having a length, a first end, a second end, and a lower cam surface, said cam rod having a slot cut into said first end thereof, a spring being placed over said first end of said cam rod, said first end of said cam rod supporting an inner diameter of said spring, said connecting rod being inserted into said slot of said cam rod, a hole being formed through said second end of said connecting rod, a pair of concentric holes being formed in said first end of said cam rod to firmly receive a dowel, said dowel retaining said cam rod and said spring, said dowel being axially retained by said inner wall of said upper telescoping tube;

a ball housing having a length, a first end, and a second end, and a bore extending from said first end to said second end, at least one radial hole which communicates with said bore, at least one said ball fitting inside at least one said radial hole, said ball housing being pressed into said upper telescoping tube; and said connecting rod having a slot at said first end, said tab of said lever being inserted into said slot, said connecting rod being inserted into said upper telescoping tube and into said first bore, a dowel being inserted into said first bore and said telescoping tube such that said connecting rod is securely constrained between said dowel and said tab of said lever, said connecting rod connecting said first end of said lever to said first end of said cam rod, wherein depressing said button forces said cam rod downward through said connecting rod, at least one said ball mating with said lower cam surface, at least one said ball escaping said radial hole into said lower cam surface on said cam rod, said telescoping tube becoming unlocked.

2. The integrated handle for telescoping tubes which facilitates easy height adjustment of a luggage carrier of claim 1, further comprising:

said cam rod having a high cam surface, and a transitional surface, said lower cam surface originating at said first end and continuing along said length to substantially the middle of said cam rod, said high cam surface originating at said second end, said high cam surface terminating with said transitional surface, said transitional surface providing a smooth transition between said high cam surface and said lower cam surface.

3. The integrated handle for telescoping tubes which facilitates easy height adjustment of a luggage carrier of claim 2, further comprising:

said upper telescoping tube slidably fitting inside said lower telescoping tube;

a washer;

said spring being retained by said washer and said dowel on one end, said spring being retained by said ball housing on the other end, wherein said spring forcing said high cam surface of said cam rod to contact at least one said ball in said ball housing, said ball engaging said plurality of locking holes in said lower telescoping tube, said lower telescoping tube being locked in relation to said upper telescoping tube.

4. The integrated handle for telescoping tubes which facilitates easy height adjustment of a luggage carrier of claim 2, further comprising:

a first dowel;

a second dowel;

a first boss extending from said bottom surface of said handle at said first end, said first end of said upper telescoping tube slidably fitting into said first boss, a pair of concentric holes which are formed in said first boss and said upper telescoping tube, said pair of concentric holes being sized to firmly receive said first dowel, said first dowel being inserted into said pair of concentric holes in said upper telescoping tube and said first boss to retain thereof; and a second boss extending from said bottom surface of said handle at said second end, said first end of said upper telescoping tube slidably fitting into said second boss, a pair of concentric holes which are formed in said first boss and said upper telescoping tube, said pair of concentric holes being sized to firmly receive said second dowel, said second dowel being inserted into said pair of concentric holes in said upper telescoping tube and said second boss to retain thereof.

5. The integrated handle for telescoping tubes which facilitates easy height adjustment of a luggage carrier of claim 1, further comprising:

a cover having a bottom surface;

a plurality of posts which extend downward from said bottom surface of said cover;

said handle having a plurality of clearance holes which are disposed to receive the plurality of posts of said cover; and a plurality of screws which fit through said plurality of clearance holes in said handle, said plurality of screws being screwed into said plurality of posts, wherein said cover is retained against said handle by said plurality of screws.

* * * * *